(12) United States Patent
Li et al.

(10) Patent No.: US 10,848,428 B2
(45) Date of Patent: Nov. 24, 2020

(54) METHOD FOR DYNAMICALLY ALLOCATING RESOURCES IN AN SDN/NFV NETWORK BASED ON LOAD BALANCING

(71) Applicants: State Grid Henan Information & Telecommunication Company, Zhengzhou (CN); Beijing University of Posts and Telecommunications, Beijing (CN)

(72) Inventors: Wencui Li, Zhengzhou (CN); Shiwen Wang, Zhengzhou (CN); Siya Xu, Beijing (CN); Gangsong Dong, Zhengzhou (CN); Shaoyong Guo, Beijing (CN); Yi Jin, Zhengzhou (CN); Xiong Li, Zhengzhou (CN); Lei Feng, Beijing (CN); Jing Shen, Zhengzhou (CN)

(73) Assignees: STATE GRID HENAN INFORMATION & TELECOMMUNCATION COMPANY, Henan (CN); BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 68 days.

(21) Appl. No.: 16/216,087

(22) Filed: Dec. 11, 2018

(65) Prior Publication Data
US 2019/0182169 A1   Jun. 13, 2019

(30) Foreign Application Priority Data
Dec. 11, 2017   (CN) .......................... 2017 1 1308125

(51) Int. Cl.
*H04L 12/857*   (2013.01)
*H04L 12/803*   (2013.01)
(Continued)

(52) U.S. Cl.
CPC ...... *H04L 47/2491* (2013.01); *G06F 9/45558* (2013.01); *G06F 9/4881* (2013.01);
(Continued)

(58) Field of Classification Search
None
See application file for complete search history.

(56) References Cited

U.S. PATENT DOCUMENTS

2013/0308444 A1* 11/2013 Sem-Jacobsen ........ H04L 45/02
370/230
2014/0181267 A1    6/2014 Wadkins et al.
(Continued)

FOREIGN PATENT DOCUMENTS

| CN | 102291308 A | 12/2011 |
| CN | 103957167 A | 7/2014 |

(Continued)

OTHER PUBLICATIONS

Bari et al. "Orchestrating Virtualized Network Functions", IEEE Transactions on Network and Service Management, vol. 13 Issue 4, pp. 725-739, Dec. 2016 [retrieved on May 25, 2020]. Retrieved from the Internet: <URL: http://shihaburchowdhury.com/files/tnsm_vnfop.pdf>. (Year: 2016).*

(Continued)

*Primary Examiner* — Sm A Rahman
*Assistant Examiner* — Dae Kim
(74) *Attorney, Agent, or Firm* — Cozen O'Connor

(57) ABSTRACT

The present application provides a method for dynamically allocating resources in an SDN/NFV network based on load balancing. For multimedia services with different demands, a virtual link mapping target, a constraint and a load state of a physical link are associated. A subtask is adaptively mapped to a network node according to the load state of the
(Continued)

physical link. The method effectively distinguishes used resources and remaining resources of a physical node and a link to balance the load, and thereby improve the utilization of network resources and avoid occurrence of a local optimum or current optimum. The solution involves performing a subtask mapping to find a server node satisfying constraints for each subtask in a service request. The model for mapping the subtask is $$\min_{T \to V} Target_1$$
$$s.t. \ C_1, C_2, C_3, C_4.$$

A virtual link mapping is then performed to find a physical path for each virtual link in the service request, which satisfies the capability constraint of the virtual link. The dynamic virtual mapping is described as $$\min_{E_T \to E_s} Target_2$$
$$s.t. \ C'_1, C'_2, C'_3.$$

5 Claims, 4 Drawing Sheets

(51) Int. Cl.
*G06F 9/48* (2006.01)
*G06F 9/455* (2018.01)
*H04L 12/715* (2013.01)
*H04L 12/725* (2013.01)
*H04L 12/721* (2013.01)

(52) U.S. Cl.
CPC .......... *H04L 45/124* (2013.01); *H04L 45/306* (2013.01); *H04L 45/64* (2013.01); *H04L 47/125* (2013.01); *G06F 2009/45595* (2013.01); *H04L 45/14* (2013.01)

(56) References Cited

U.S. PATENT DOCUMENTS

| | | | |
|---|---|---|---|
| 2016/0105489 A1* | 4/2016 | Llorca | G06F 9/50 709/226 |
| 2017/0093698 A1* | 3/2017 | Farmanbar | H04L 45/38 |
| 2017/0222905 A1* | 8/2017 | Leroux | H04L 43/0876 |
| 2018/0349202 A1* | 12/2018 | Sharma | H04L 45/586 |

FOREIGN PATENT DOCUMENTS

| | | |
|---|---|---|
| CN | 104219127 A | 12/2014 |
| CN | 105262669 A | 1/2016 |

OTHER PUBLICATIONS

Riggio et al. "Virtual Network Functions Orchestration in Wireless Networks", CNSM 2015 11th Int'l Conf. on Network and Service Management, pp. 108-116, Nov. 2015 [retrieved on May 25, 2020]. Retrieved from the Internet: <URL: https://hal.archives-ouvertes.fr/hal-01292221/document>. (Year: 2015).*

Palkar et al. "E2: A Framework for NFV Applications", SOSP '15, pp. 121-136, Oct. 2015 [retrieved on May 25, 2020]. Retrieved from the Internet: <URL: https://people.eecs.berkeley.edu/~sylvia/cs268-2016/papers/e2.pdf>. (Year: 2015).*

* cited by examiner

METHOD FOR DYNAMICALLY ALLOCATING RESOURCES IN AN SDN/NFV NETWORK BASED ON LOAD BALANCING

CROSS REFERENCE TO RELATED APPLICATION

The present application claims the priority to a Chinese Patent Application No. 201711308125.0 filed with the China National Intellectual Property Administration on Dec. 11, 2017 and entitled "METHOD FOR DYNAMICALLY ALLOCATING RESOURCES IN AN SDN/NFV NETWORK BASED ON LOAD BALANCING", which is incorporated herein by reference in its entirety.

TECHNICAL FIELD

The present application relates to the technical field of dynamic resource allocation, and particularly to a method for dynamically allocating resources in an SDN/NFV network based on load balancing.

BACKGROUND

In recent years, with the increase of users QoS demands for differentiated multimedia services, multimedia traffic is exploding and further creating great pressure on the current carrying network. In the current operator network, absence of intelligent carrying plane and system closure caused by tightly coupled structure of services and network devices cause problems such as low resource utilization, a long period for deploying new services, and insufficient perception and differentiation guaranty. Thus, it is quite significant to study how to quickly and efficiently accomplish the end-to-end transmission of differentiated multimedia services.

In a network, the processing and storing capability of a node is limited, and link bandwidth limits the carried traffic. Negligence of available capacity of nodes and links can greatly reduce network balance. Non-balance of the network not only harms transmission quality of the carried traffic but also affects selection of a transmission path for carried traffic. Therefore, it is necessary to consider differentiation of service demands and network load balancing in a scheduling policy of network resources.

Motivated by the above demands and technologies, the present application provides a method for dynamically allocating resources based on load balancing, and provides a scheduling policy offering more flexibility and balance for end-to-end transmission of multimedia services. It has been proved through experiments that the algorithm can quickly and efficiently select an optimal path to transmit multimedia services in an SDN/NFV-based network platform, which ensures network load balancing and substantially enhances QoS of the service with low costs.

To understand development constraints of the prior art, comparison and analysis have been made on existing papers and patents. The following technical solutions are highly correlated to the present application.

Technical solution 1: A non-competitive conflict-free dynamic resource allocation method is described in the Patent No. CN105792371A entitled "Non-competitive Conflict-free Dynamic Resource Allocation Method Based on Distributed Network". The method is implemented mainly in two fashions, a semi-dynamic fashion and a dynamic fashion. In the case of the semi-dynamic fashion, the network resource allocation can be adjusted in real time according to the number of current network nodes. The method in this fashion is an improved fixed resource allocation method, which causes no conflicts in resource uses. In the case of the dynamic fashion, more resources than the average can be allocated to a user under a special situation based on the specific demand of the user. The resources are acquired by application. The method in this fashion is a non-competitive method for using resources. The method is capable of adapting to the current network capacity, and can guarantee the demand of a specific user for resources. The method is simple to implemented, cost efficient and free of conflicts, and is quite suitable for a distributed self-organizing network with variable nodes.

Technical solution 2: A method for grading messages and dynamically allocating resources is described in the Patent No. CN105516276A "A Message Processing Method and System Based on Bionic Hierarchical Communication". The method is implemented mainly in seven steps. In the first step, each node of a distributed system sends an unclassified message to a message receiver. In the second step, the message receiver classifies the messages through a message classifier. In the third step, different types of messages stream to different message distribution engines. In the fourth step, the message distribution engines send the messages to a message processor through different processing interfaces. In the fifth step, the message processor completes processing of the messages through a message processing plug-in. In the sixth step, an engine resource consumption monitor monitors each of the message distribution engines and sends the monitoring data to an engine resource manager. In the seventh step, the engine resource manager dynamically computes resource quantity used by each engine according to the received monitoring data and the workload status of the engine. According to the method and the system, message classification is defined from communication scenes, so that unified message processing is realized; dynamic resource allocation is adopted, so that proper reliability and real-time performance can be guaranteed for each of different attribute messages; and the message processing work is accomplished outside an application, so that difficulty in developing the application is reduced.

Technical solution 3: An NFV dynamic resource distribution method Patent No. CN105468435A "NFV Dynamic Resource Distribution Method". The method is implemented mainly in three steps. In the first step, a virtual machine periodically reports a resource occupation constraint and the priority of a VNF (Virtualized Network Function) or VNFC (Virtualized Network Function Component) running in the virtual machine to an MANO (Management and Orchestration). In the second step, the MANO collects the resource occupation constraint of each virtual machine and priority information of the VNF or VNFC running in the virtual machine, and updating and records. In the third step, the MANO performs virtual resource optimization in a virtual machine or virtual resource optimization over virtual networks or over physical networks according to record information. Different processes are carried out according to the state of each of the virtual machines and the priority of the VNF or VNFC running in the virtual machine during the virtual resource optimization. The virtual resource optimization can be carried out across virtual networks or across physical networks when there is no available resource in a virtual network. With the NFV dynamic resource distribution method, the occupation constraint of virtual resources in each virtual machine is automatically detected, so that the a service with a high priority occupies resources first and service performance thereof can be ensured, and idle virtual resources in the virtual machine are released.

Technical solution 1 employs a non-competitive conflict-free dynamic resource allocation method based on a distributed network. A cluster head notifies, through broadcast, wireless network temporary indication mapping table information RntiMap of the current distributed network to all nodes in the distributed network. A node broadcasts information carried by the broadcast through its own broadcast frame after receiving the broadcast from the cluster head. A node, after receiving the broadcast of the cluster head or of other nodes, calculates the total number of nodes in the current network and their RNTIs and the number of nodes with an RNTI value smaller than its own RNTI value according to the information carried in broadcast information, and thereby completes the semi-dynamic allocation. If a node needs more resources due to burst traffic, resource allocation of the dynamic fashion will be employed instead of the resource allocation of semi-dynamic fashion. The method is disadvantageous in not grading the services and failing to provide services of high QoS.

Technical solution 2 employs a message processing method and system based on bionic hierarchical communication. A message receiver classifies unclassified information from nodes; and sends messages of different classes to different message classification engines. There are three types of message engines: streamed message distribution engines, point-to-point real-time message engines and crash recovery message engines. A message distribution engine sends the messages to a message processor through different processing interfaces. The message processor processes the messages by a message processing plug-in. An engine resource consumption monitor of the message distribution engine monitors resource utilization of respective message distribution engines and the remaining resource quantity of the distributed system over time, and sends the resource utilization and remaining resource quantity of the distributed system to an engine resource manager of the message distribution engine as monitoring data. The engine resource manager dynamically calculates the amount of resources that can be used by each message distribution engine according to the received monitoring data and the workload status of that message distribution engine. This ensures that high real-time message can be processed timely. The method is disadvantageous in that there are huge amount information needs to be processed, and the method is not applicable to a network with instantaneous high loads and cannot be widely used.

Technical solution 3 employs an NFV dynamic resource distribution method. A virtual machine periodically reports a resource occupation constraint and the priority of a VNF or VNFC running in the virtual machine to an MANO. The MANO sets a resource occupation threshold for the resource occupation constraint of the virtual machine running VNF or VNFC and sets a priority for the VNF or VNFC running on the virtual machine. The MANO collects the resource occupation constraint of each virtual machine and priority information of the VNF or VNFC running in the virtual machine, and updates records. The MANO performs virtual resource optimization in a virtual machine or virtual resource optimization over virtual networks or over physical networks according to record information. The method can be used to detect the resource utilization of a virtual machine, but its drawback lies in that the resource allocation process is not sufficiently refined and the service objects concerned lack diversity.

SUMMARY

To overcome the drawbacks existing in the prior art, the present application provides a method for dynamically allocating resources in an SDN/NFV network based on load balancing. For multimedia services of different demands, the method considers a virtual link mapping target, constraints and the load states of physical links, and adaptively maps a subtask to a network node according to the load states of physical links. The method effectively distinguishes used resources and remaining resources of physical nodes and links to balance the load and thereby to improve the network resource utilization, and avoid occurrence of the local optimum or current optimum.

A technical solution employed by the present application comprises the following steps:

S1: creating a task-network model.

1. A general serial Directed Acyclic Graph (DAG) is used to represent different services, which is represented as $D_T=(T, E_T)$, where $T=\{T_1, \ldots, T_{t'}, \ldots, T_\Phi\}$ represents a subtask of a service, and $E_T=(e_{uv})$ represents a virtual link from a node u to a node v. Each node in the DAG represents a subtask. A binary number $x_{it}$ represents a performing state of the subtask t in the node i, and $x_{it}$ indicates that the node i is performing the subtask t when its value is 1. FIG. 1 illustrates a DAG for a service chain. The QoS of the service is optimized on the whole by reasonably mapping nodes that perform subtasks of different services and mapping paths, with the load balancing of links.

2. Based on the SDN/NFV network model, a substrate network is modeled as an undirected graph $G=(V, E_S)$, where a vertex $V=\{1, \ldots, i, \ldots, N\}$ represents a physical network node, and a set of undirected edges $E_S=\{e_{ij}\}$ represents a network link. Each network element has specific available resources. Different services have different demands and task parameters, and consume a processing capability of nodes and links. A node performing a subtask and a path are allocated according to service demands. The remaining capacity is taken into consideration in node and path selection. It is desirable to select a node or a link with more remaining resources. The load of the whole network is thus balanced, and the transmission of the service is achieved with high quality.

S2: creating an allocation model on the basis of S1, to achieve mappings for subtasks and for virtual links.

1. A server node satisfying constraints for a subtask in a service request is determined, and the formula for mapping the subtask is:

$$M_{task}:T \to V.$$

The constraints are as follows:

Constraint 1: each task t can be performed on only one node, namely, $$C_1: \sum_{i \in Z} x_{it} = 1 \ \forall t \in T;$$

Constraint 2: each node can perform at least one subtask, namely, $$C_2: \sum_{t \in T} x_{it} \geq 1 \ \forall i \in Z;$$

Constraint 3: if a node i is performing a task t, a node j which is to perform a task (t+1) (the next task) must be connected to the node i, namely, $$C_3: e_{ij} = \begin{cases} 1 & \text{if } x_{it=1} \text{ AND } x_{j,(t+1)} = 1 \\ 0 & \text{otherwise} \end{cases} \quad \forall i, j \in Z;$$

Constraint 4: each node has specific available resources, and each subtask requires specific CPU and memory resources from the server node, the available resources of the node i thus cannot be less than resources that the subtask t needs, and 10% of resources are reserved for redundancy and backup, namely, $$C_4: \begin{cases} 90\% \bullet CPU^i_{available} \geq CPU^t_{required} \\ 90\% \bullet Memory^i_{available} \geq Memory^t_{required} \end{cases}.$$

The mapping of the subtask is implemented aiming to achieve optimal balancing and the use of minimum server nodes. The number of server nodes is represented with N. The balancing is represented with a variance of the consumed resources of server nodes and is expressed as:

$$\sigma^2_{server} = \left[ \sum_{i=1}^{N} (CPU^i_{consumed} - \overline{CPU})^2 + \sum_{i=1}^{N} (Memory^i_{consumed} - \overline{Memory})^2 \right] / 2N,$$

where $\overline{CPU}$ and $\overline{Memory}$ are average consumption quantities of the CPU and the memory of a server node respectively, and an objective function is:

$$Target_1 = \alpha \cdot \overline{\sigma_{server}^2} + \beta \cdot \overline{N},$$

where α and β are weights of the level of balancing and the average of the number of nodes respectively, and the normalized α+β=1.

A model for mapping subtasks is determined as:

$$\min_{T \to V} Target_1$$
$$s.t. \ C_1, C_2, C_3, C_4.$$

2. After VNFs being mapped to network nodes, for the virtual link in the service request, a physical path satisfying a capability constraint is determined and implemented for the virtual link by an SDN controller, which is expressed as:

$$M: E_T \to E_S.$$

Constraint 1: a required bandwidth of the virtual link cannot be larger than a remaining available bandwidth of the physical link to which the virtual link is mapped, namely, the constraint on the bandwidth for the mapping of the virtual link is:

$$C_1': B(E_T(u,v)) \leq R^B(E_S(i,j));$$

Constraint 2: with a delay demand of service transmission being considered, a length of a physical path cannot be larger than an upper tolerance of a path length of a virtual link, and the constraint on the path is:

$$C_2': len(ps) \leq len(E_T),$$

where len(ps) is the length of the physical path ps, i.e., the number of links contained in the path;

Constraint 3: during the mapping of the virtual link $E_T(u, v)$, the sum of directed flows of physical nodes which a task flow passes through except for the source node and the destination node is 0, $$C_3': \sum_{i,j \in T} f_{ij}^{uv} - \sum_{i,j \in T} f_{ji}^{uv} = \begin{cases} 1, & \text{if } x_i^u = 1 \\ -1, & \text{if } x_j^v = 1 \\ 0, & \text{otherwise} \end{cases}$$
$$\forall u, v \in T, f_{ij}^{uv} \in \{0, 1\}.$$

An objective function for network resource allocation is determined, which comprises costs and benefits of a link and a node performing a task and weights corresponding to different services, wherein the formula is defined as:

$$Target_2 = \eta \cdot QoS(C) + \rho \cdot \overline{cost(C)},$$

where QoS(C) and cost(C) are the normalized QoS and cost, η and ρ are weighting factors of QoS(C) and cost(C) respectively, and the factors vary depending on services.

A cost with nodes and links is determined. The cost function is cost=f(bandwidth, CPU), and a specific formula is as follows:

$$cost = \sum_{t \in T} CPU_{SDN_t} + \sum_{t \in T} \sum_{(i,j) \in L} \lambda_{i,j} \times B_{(i,j)},$$

where t is the task being performed in a link, L is a routing path during the performing of the task, $B_{(i,j)}$ represents a bandwidth occupied on a link from node to node, and $\lambda_{i,j}$ is a weight for the bandwidth of the link occupied by a task flow from node to node, $$\lambda_{i,j} = \frac{B_{(i,j)consumed} + \Gamma}{B_{(i,j)total}},$$

where $B_{(i,j)consumed}$ and $B_{(i,j)total}$ are a bandwidth consumed and a total bandwidth of the link from node i to node j, and Γ is a very small number for preventing the numerator from being 0.

QoS involves many factors. Certain factors include a sudden loss (SL), packet loss (PL), packet jitter (PJ), packet delay (PD) and bandwidth (BW). A weight corresponding to each factor is calculated using an analytic hierarchy process, so as to obtain the following formula for calculating the normalized QoS (QoS(C)):

$$QoS(C) = SL \times \Phi_{SL} + PL \times \Phi_{PL} + PJ \times \Phi_{PJ} + PD \times \Phi_{PD} + BW \times \Phi_{BW},$$

where $\Phi_i$ (such as $\Phi_{SL}$ and $\Phi_{PD}$) represents a weight corresponding to a factor i, and the weight is calculated using the analytic hierarchy process and has passed a consistency check, and well represent a proportion of impact exerted by its corresponding factor on the overall QoS.

A dynamic virtual mapping is determined as:

$$\min_{E_T \to E_s} Target_2$$
$$\text{s.t. } C'_1, C'_2, C'_3.$$

With the above technical solution, the present application has the following advantages as compared with the prior art.

The technology proposes a method for allocating resources based on load balancing after the study of the dynamic resource allocation in an SDN/NFV environment, aiming at optimizing the dynamic resource allocation with respect to multimedia services. The mapping of subtasks is first performed to find a server node satisfying constraints for each subtask in the service request. The mapping of virtual links is then performed for each virtual link in the service request to find a physical path satisfying the capability constraint of that virtual link. The quality of service and the cost constraints are included to evaluate availability of the solution. It has been proved that, on the SDN/NFV network platform, the method can quickly and effectively select an optimal path to transmit a multimedia service, and significantly improves the QoS of the service with low costs while ensuring network load being balanced.

DETAILED DESCRIPTION

The above-mentioned and other techniques, features and effects of the present application will become apparent on examination of the following detailed description of embodiments illustrated with reference to FIG. 1 to FIG. 9. The description relating to structures hereafter are all described with reference to the drawings.

Embodiment 1 provides a method for dynamically allocating resources in an SDN/NFV network based on load balancing, comprising the following steps:

S1: creating a task-network model.

Figure 1:
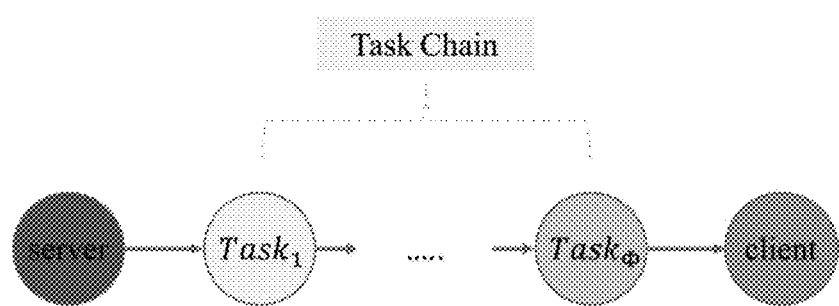
FIG. 1 is a DAG diagram showing a task chain according to the present application.
Figure 2:
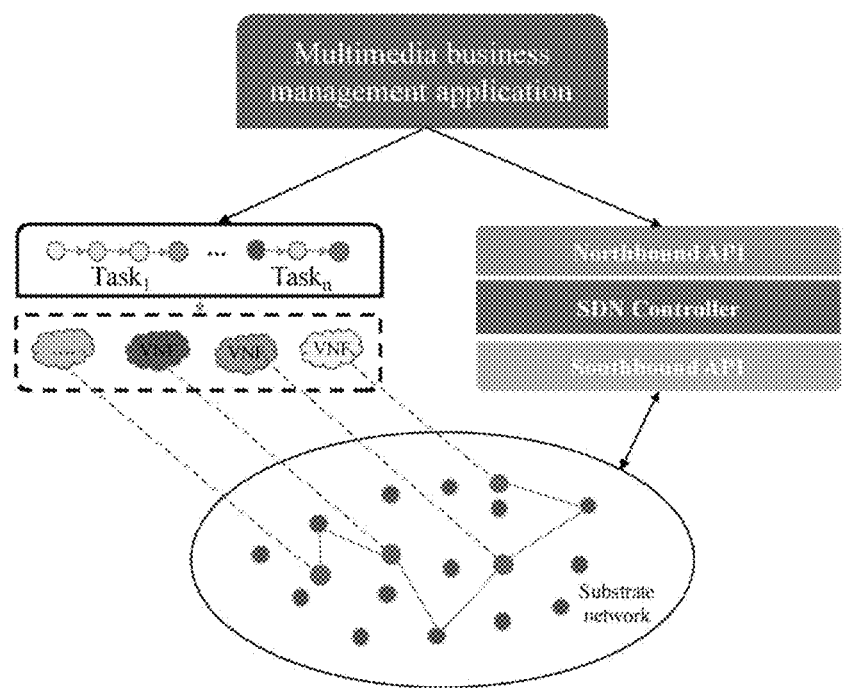
FIG. 2 is a diagram showing a SDN/NFV network model according to the present application.

1. A general serial DAG is used to represent different services, which is represented as $D_T=(T, E_T)$, where $T=\{T_1, \ldots, T_t, \ldots, T_\Phi\}$ represents a subtask of a service, and $E_T=(e_{uv})$ represents a virtual link from a node u to a node v. Each node in the DAG represents a subtask. A binary number $x_{it}$ represents a performing state of the subtask t in the node i, and $x_{it}$ indicates that the node i is performing the subtask t when its value is 1. FIG. 1 illustrates a DAG for a service chain. The QoS of the service is optimized on the whole by reasonably mapping nodes that perform subtasks of different services and mapping paths, with the balancing of traffic carried by a link ensured.

2. Based on the SDN/NFV network model, a substrate network is modeled as an undirected graph $G=(V, E_S)$, where a vertex $V=\{1, \ldots, i, \ldots, N\}$ represents a physical network node, and a set of undirected edges $E_S=\{e_{ij}\}$ represents a network link. Each network element has specific available resources. Different services have different demands and task parameters, and consume a processing capability of nodes and bandwidth of links. A node performing a subtask and a path are allocated according to service demands. The node's remaining capacity is taken into consideration in selecting a node and a path. It is desirable to select a node or a link with a large remaining capacity. The load of the whole network is thus balanced, and the transmission of the service is achieved with high quality.

S2: creating an allocation model on the basis of S1, to achieve mappings for subtasks and virtual links.

1. A server node satisfying a constraint is found for a subtask in a service request. The formula for mapping the subtask is:

$$M_{task}: T \to V.$$

Its constraints are as follows:

Constraint 1: each task t can be performed on only one node, namely, $$C_1: \sum_{i \in Z} x_{it} = 1 \quad \forall t \in T;$$

Constraint 2: each node can perform at least one subtask, namely, $$C_2: \sum_{t \in T} x_{it} \geq 1 \quad \forall i \in Z;$$

Constraint 3: if a node i is performing a task t, a node j which is to perform a task (t+1) (the next task) must be connected to the node i, namely, $$C_3: e_{ij} = \begin{cases} 1 & \text{if } x_{it=1} \text{ AND } x_{j,(t+1)} = 1 \\ 0 & \text{otherwise} \end{cases} \quad \forall i, j \in Z;$$

Constraint 4: each node has specific available resources, and each subtask requires specific CPU and memory from the server node. Therefore, the available resources of the node i cannot be less than resources that the subtask t needs, and 10% of the resources are reserved for redundancy and backup, namely, $$C_4: \begin{cases} 90\% \bullet CPU^i_{available} \geq CPU^t_{required} \\ 90\% \bullet Memory^i_{available} \geq Memory^t_{required} \end{cases}.$$

The mapping of subtasks is achieved with optimal balancing and minimum server nodes. The number of server nodes is represented with N. The balancing is represented with a variance of the consumed resources of server nodes, and is expressed as:

$$\sigma_{server}^2 = \left[ \sum_{i=1}^{N}(CPU_{consumed}^i - \overline{CPU})^2 + \sum_{i=1}^{N}(Memory_{consumed}^i - \overline{Memory})^2 \right] \Big/ 2N,$$

where $\overline{CPU}$ and $\overline{Memory}$ are average consumption quantities of the CPU and the memory of a server node respectively. The objective function is:

$$Target_1 = \alpha \cdot \overline{\sigma_{server}^2} + \beta \cdot \overline{N},$$

where $\alpha$ and $\beta$ are normalized weights for the level of balancing and average of the number of nodes, and $\alpha + \beta = 1$.

A model for mapping subtasks is expressed as:

$$\min_{T \to V} Target_1$$
$$s.t. \ C_1, C_2, C_3, C_4.$$

2. After VNFs is mapped to network nodes, a physical path satisfying capability constraints of the virtual link in the service request is found for the virtual link, and an SDN controller implements the mapping of the virtual link. The formula for mapping the virtual link is expressed as:

$$M: E_T \to E_S.$$

Constraint 1: a required bandwidth of the virtual link cannot be larger than a remaining available bandwidth of the physical link to which the virtual link is mapped, namely, the constraint on the bandwidth for the mapping of the virtual link is:

$$C_1': B(E_T(u,v)) \le R^B(E_S(i,j)).$$

Constraint 2: considering a delay demand of service transmission, a length of a physical path cannot be larger than an upper tolerance of a path length of a virtual link. The constraint on the path is:

$$C_2': \text{len}(ps) \le \text{len}(E_T),$$

where len(ps) is the length of the physical path ps, i.e., the number of links contained in the path.

Constraint 3: during the mapping of the virtual link $E_T(u,v)$, the sum of directed flows of physical nodes which a task flow passes through except for the source node and the destination node is 0, $$C_3': \sum_{i,j \in T} f_{ij}^{uv} - \sum_{i,j \in T} f_{ji}^{uv} = \begin{cases} 1, & \text{if } x_i^u = 1 \\ -1, & \text{if } x_j^v = 1 \\ 0, & \text{otherwise} \end{cases}$$

$$\forall u, v \in T, f_{ij}^{uv} \in \{0, 1\}.$$

An objective function for network resource allocation is defined. The objective function includes costs and benefits of a link and of a node performing a task and weights corresponding to different services. The formula is defined as:

$$Target_2 = \eta \cdot QoS(C) + \rho \cdot \overline{cost(C)},$$

where QoS(C) and cost(C) are the normalized QoS and cost, and $\eta$ and $\rho$ are weighting factors of QoS(C) and cost(C) respectively, which vary depending on services.

Costs involve nodes and links. A cost function is cost=f (bandwidth, CPU), and the specific formula is as follows:

$$cost = \sum_{t \in T} CPU_{SDN_t} + \sum_{t \in T} \sum_{(i,j) \in L} \lambda_{i,j} \times B_{(i,j)},$$

where t is the task being performed on a link, L is a routing path when performing the task, $B_{(i,j)}$ represents a bandwidth occupied from node i to j node, and $\lambda_{i,j}$ is a weight for the bandwidth of the link occupied by a task flow from node i to node j.

$$\lambda_{i,j} = \frac{B_{(i,j)consumed} + \Gamma}{B_{(i,j)total}},$$

where $B_{(i,j)consumed}$ and $B_{(i,j)total}$ are a consumed bandwidth and a total bandwidth of the link from node i to node j, and $\Gamma$ is a very small number preventing the numerator from being 0.

QoS involves many factors. Certain factors include a sudden loss (SL), packet loss (PL), packet jitter (PJ), packet delay (PD) and bandwidth (BW). A weight corresponding to each factor is calculated using an analytic hierarchy process. The formula for calculating the normalized QoS (QoS(C)) is thus obtained, which is:

$$QoS(C) = SL \times \Phi_{SL} + PL \times \Phi_{PL} + PJ \times \Phi_{PJ} + PD \times \Phi_{PD} + BW \times \Phi_{BW},$$

where $\Phi_i$ (such as $\Phi_{SL}$ and $\Phi_{PD}$) represents a weight corresponding to a factor i, and the weight is calculated using the analytic hierarchy process and has passed the consistency check, and thus can well represent a proportion of impact exerted by its corresponding factor on the overall QoS.

To conclude, a dynamic virtual mapping is expressed as:

$$\min_{E_T \to E_S} Target_2$$
$$s.t. \ C_1', C_2', C_3'.$$

Figure 3:
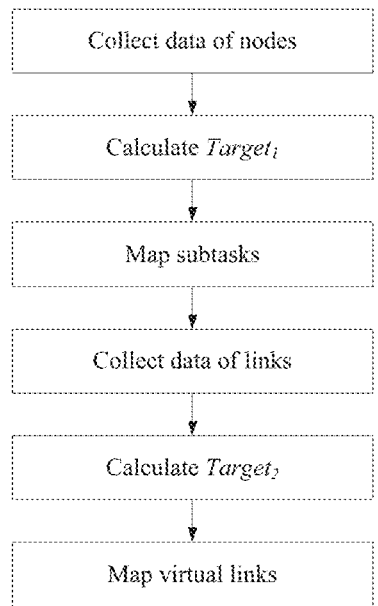
FIG. 3 is a flow chart of the present application.
Figure 4:
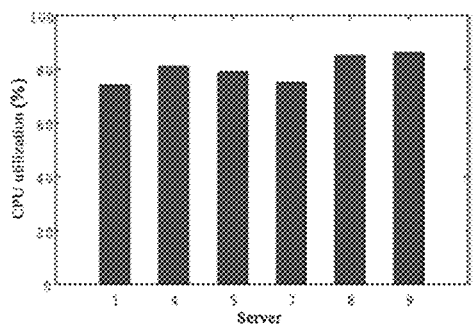
FIG. 4 is a diagram of showing the usage of a CPU after balancing according to the present application.
Figure 5:
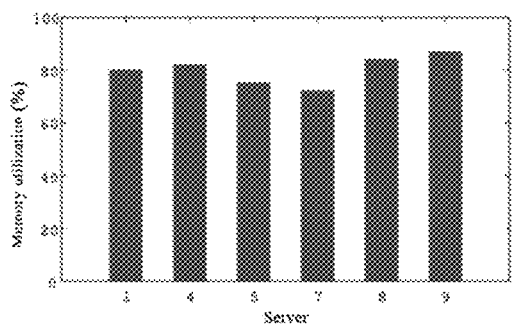
FIG. 5 is a diagram showing the usage of a memory after balancing according to the present application.
Figure 6:
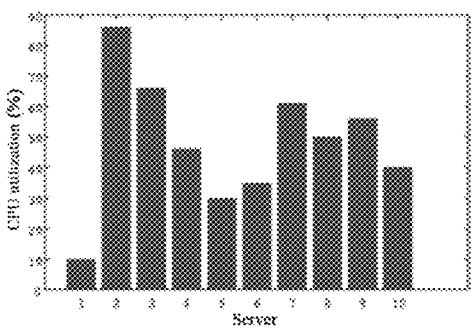
FIG. 6 is a diagram showing the usage of a CPU before balancing according to the present application.
Figure 7:
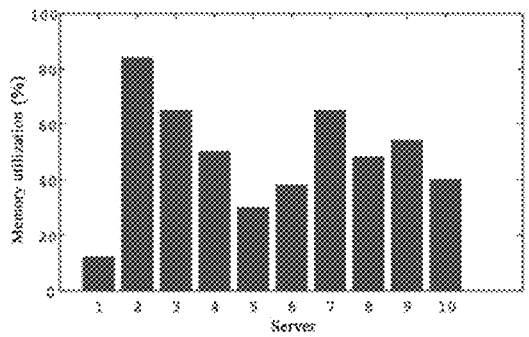
FIG. 7 is a diagram showing the usage of a memory before balancing according to the present application.

In practice, the method for dynamically allocating resources in an SDN/NFV network based on load balancing with respect to multimedia services is explained in detail with reference to FIG. 3. At step 1, node data information needed is collected within the network. At step 2, a value of the objective function is calculated according to collected node data information. At step 3, a node to which a subtask is mapped is determined according to the calculated value of the objective function. At step 4, link data information needed is collected within the network. At step 5, a value of the objective function is calculated according to collected link data information. At step 6, a manner in mapping a virtual link is calculated according to this value of the objective function.

Referring to FIGS. 4-7, the load balancing of servers in allocating subtasks is verified. Ten servers are provided to perform the subtasks. The method according to the present application allows load balancing of the server nodes while using as few severs as possible. A simulation result is shown in the figures. In the case that the balancing is taken into consideration, only 6 servers are used. The usages of the CPUs stay in the range from 65% to 85%, and the usages of the memories stay in the range from 70% to 85%. In the case that the balancing is not taken into consideration, all of the 10 servers are used to perform the service. The usages of the CPUs and the usages of the memories vary significantly from server to server, and the loads across the servers are unbalanced.

Figure 8:
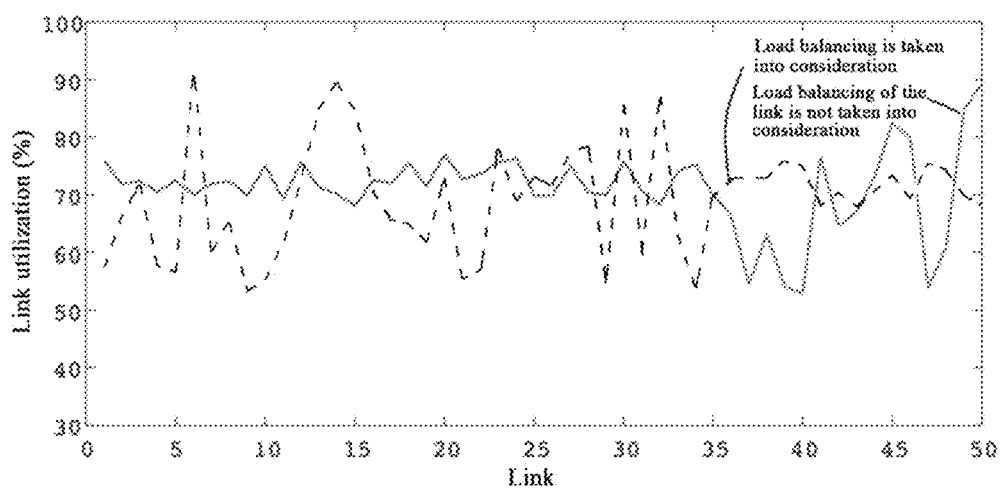
FIG. 8 is a diagram showing the contrast for mapping links according to the present application.

Next, referring to FIG. 8, the load balancing in mapping the virtual links is verified. The verification is carried out in 50 links. The mapping for virtual links is achieved by the method with the load balancing of the link taken into consideration. The usage of each link stays in the range from 68% to 78%. In the case that the balancing is not taken into account, the usages of the links vary greatly, fluctuating at 53%-93%. The non-balancing of the links severely affects the QoS of the current service, and will affect the quality of a service to be carried. Therefore, the balancing of the link being taken into consideration is of great importance for improving the carrying capability of the network.

Figure 9:
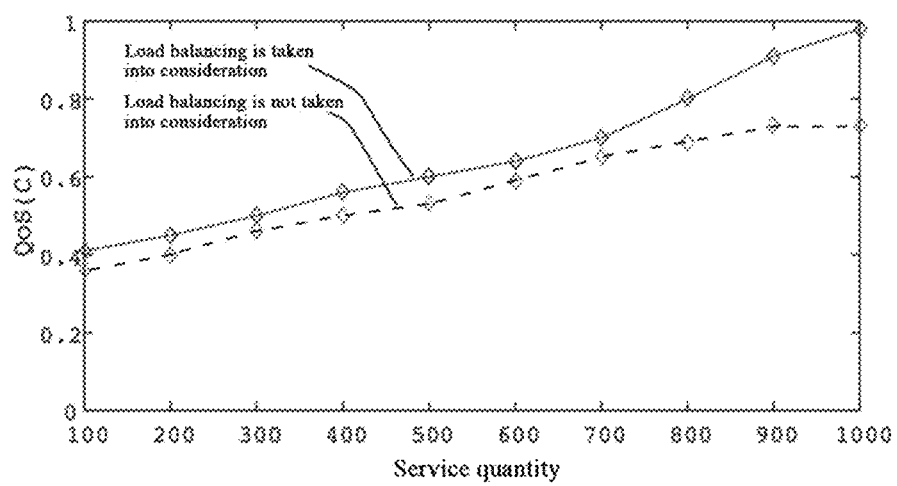
FIG. 9 is a diagram showing the contrast of impacts of balancing on QoS according to the present application.

Finally, referring to FIG. 9, the impact exerted by the link balancing on the QoS of the carried service is verified through experiments. In the case that the balancing is considered, the QoS value of the service is smaller than that in the case where the load balancing is not considered. This indicates that in the case of link balancing, the time delay, jitter and packet loss rate of the service are relatively small. Moreover, when service traffic increases, a network with the load-balanced link may contribute a lot to good service quality.

The present application is not limited to the specific implementations that have just been described in detail. Variations and adjustments of operations and data made by those skilled in the art based on the concept of the technical solutions of the present application all should fall within the protection scope of the present application.

The invention claimed is:

1. A method for dynamically allocating resources in an SDN/NFV network based on load balancing, comprising:
    creating a task-network model, which comprises a directed acyclic graph DAG of a service and an undirected graph of a network; and
    creating an allocation model based on the task-network model to achieve mappings for subtasks and for virtual links;
    wherein creating the allocation model based on the task-network model comprises:
    determining physical nodes for respective subtasks which satisfy a first constraint, to obtain a model for mapping subtasks onto physical nodes; and
    determining physical paths for respective virtual links which satisfy a second constraint, to achieve the mapping for the virtual links;
    wherein the first constraint comprises the following constraints:
    Constraint 1: each task can be performed only on one physical node, $$C_1: \sum_{i \in Z} x_{it} = 1 \; \forall \, t \in T;$$

Constraint 2: each physical node can perform at least one subtask, $$C_2: \sum_{t \in T} x_{it} \geq 1 \; \forall \, i \in Z;$$

Constraint 3: if a physical node i is performing a subtask t, a physical node j which is to perform the next subtask t+1 must be connected to the physical node i, $$C_3: e_{ij} = \begin{cases} 1 & \text{if } x_{it=1} \text{ AND } x_{j,(t+1)} = 1 \\ 0 & \text{otherwise} \end{cases} \; \forall \, i, j \in Z;$$

and
    Constraint 4: available resources on physical node i cannot be less than resources required by subtask t, and 10% of the resources are reserved for redundancy and backup, $$C_4: \begin{cases} 90\% \cdot CPU_{available}^i \geq CPU_{required}^t \\ 90\% \cdot Memory_{available}^i \geq Memory_{required}^t \end{cases}.$$

2. The method of claim 1, wherein creating the task-network model comprises:
    creating the DAG of the service, which is represented as $D_T=(T, E_T)$, where $T=(T_1, T_2, \ldots, T_\Phi)$ is a node in the DAG, and $E_T=(e_{uv})$ represents a virtual link from node u to node v, and each node in the DAG representing a subtask; and
    allocating a physical node and a path to each subtask for performing according to requirements of the service and remaining capacities of physical nodes and paths to obtain the undirected graph of the network, which is represented as $G=(V, E_s)$, where $V=\{1, \ldots, i, \ldots, N\}$ represents a physical node, and $E_s=\{e_{ij}\}$ is a set of undirected edges and represents physical links, and each physical node having a specific available resource.

3. The method of claim 1, wherein determining physical nodes for respective subtasks which satisfy a first constraint, to obtain a model for mapping subtasks onto physical nodes, comprises:
    calculating a level of balancing of the physical nodes according to the following formula:

$$\sigma_{server}^2 = \left[ \sum_{i=1}^{N} (CPU_{consumed}^i - \overline{CPU})^2 + \sum_{i=1}^{N} (Memory_{consumed}^i - \overline{Memory})^2 \right] \Big/ 2N,$$

where N is the number of the physical nodes, $\overline{CPU}$ and $\overline{Memory}$ are average CPU consumption and memory consumption of the physical nodes;
    determining a first objective function based on the level of balancing of the physical nodes, wherein an expression of the first objective function is:

$$\text{Target}_1 = \alpha \cdot \overline{\sigma_{server}^2} + \beta \cdot \overline{N},$$

where $\alpha$ and $\beta$ are normalized weights for the level of balancing and the average of the number of the physical nodes respectively, and $\alpha + \beta = 1$; and
    determining the model for mapping subtasks based on the first constraint and the first objective function, with a maximum level of balancing and least physical nodes, wherein model for mapping subtasks is:

$$\min_{T \to V} Target_1$$

s.t. $C_1, C_2, C_3, C_4$.

4. The method of claim 1, wherein the second constraint comprises the following constraints:
   Constraint 1: a bandwidth that a virtual link requires is not larger than a remaining available bandwidth of a physical link onto which the virtual link is mapped, and the constraint on bandwidth for the mapping of the virtual link is $C_1': B(E_T(u,v)) \leq R^B(E_S(i,j));$ Constraint 2: a length of a physical path is not larger than an upper tolerance of a path length of a virtual link, and the constraint on the physical path is:

$C_2': \text{len}(ps) \leq \text{len}(E_T),$ where len(ps) is a length of the physical path ps, which is the number of links contained in the physical path; and
   Constraint 3: during the mapping of the virtual link $E_T(u, v)$, the sum of directed flows of physical nodes which a task flow passes through except for the source node and the destination node is 0, $$C_3': \sum_{i,j \in T} f_{ij}^{uv} - \sum_{i,j \in T} f_{ji}^{uv} = \begin{cases} 1, & \text{if } x_i^u = 1 \\ -1, & \text{if } x_j^v = 1 \\ 0, & \text{otherwise} \end{cases}$$

$\forall u, v \in T, f_{ij}^{uv} \in \{0, 1\}.$

5. The method of claim 4, wherein determining physical paths for respective virtual links which satisfy a second constraint, to achieve the mapping for the virtual links, comprises:
   determining a normalized cost=f(bandwidth, CPU) as $$\text{cost} = \sum_{t \in T} CPU_{SDN_t} + \sum_{t \in T} \sum_{(i,j) \in L} \lambda_{i,j} \times B_{(i,j)},$$

where t is a subtask being executed in a link, L is a physical path during performing of subtask, B(i,j) represents a bandwidth occupied on a link from physical node i to physical node j, and $\lambda_{i,j}$ is a weight for the bandwidth occupied on the link by a task flow from physical node i to physical node j, $$\lambda_{i,j} = \frac{B_{(i,j)consumed} + \Gamma}{B_{(i,j)total}},$$

where $B_{(i,j)consumed}$ is a bandwidth consumed on the link from physical node i to j, $B_{(i,j)total}$ is a total bandwidth of the link from physical node i to j, and $\Gamma$ is a random number for preventing the numerator from being 0;
   determining a formula for calculating a normalized QoS as:

$$QoS(C) = SL\Phi_{SL} + PL \times \Phi_{PL} + PJ \times \Phi_{PJ} + PD \times \Phi_{PD} + BW \times \Phi_{BW},$$

where $\Phi_i$ represents a weight corresponding to a factor i, and the factor i comprises a sudden loss (SL), packet loss (PL), packet jitter (PJ), packet delay (PD), and bandwidth (BW);
   determining a second objective function based on the normalized QoS and the normalized cost, wherein the second objective function is:

$$Target_2 = \eta \cdot QoS(C) + \rho \cdot \overline{\text{cost}(C)},$$

where QoS(C) is the normalized QoS and cost(C) is the normalized cost, and $\eta$ and $\rho$ are weighting factors for QoS(C) and cost(C) respectively, which vary depending on services; and
   determining a model for mapping virtual links based on the second objective function and the second constraint, wherein the model for mapping virtual links is:

$$\min_{E_T \to E_S} Target_2$$

s.t. $C_1', C_2', C_3'$.

\* \* \* \* \*